(12) United States Patent
Schuh et al.

(10) Patent No.: US 9,512,039 B2
(45) Date of Patent: Dec. 6, 2016

(54) OLIGOCRYSTALLINE CERAMIC STRUCTURES FOR ENHANCED SHAPE MEMORY AND PSEUDOELASTIC EFFECTS

(71) Applicants: Massachusetts Institute of Technology, Cambridge, MA (US); Nanyang Technological University, Singapore (SG)

(72) Inventors: Christopher A. Schuh, Wayland, MA (US); Alan Lai, Cambridge, MA (US); Zehui Du, Singapore (SG)

(73) Assignees: Massachusetts Institute of Technology, Cambridge, MA (US); Nanyang Technological University, Singapore (SG)

( * ) Notice: Subject to any disclaimer, the term of this patent is extended or adjusted under 35 U.S.C. 154(b) by 248 days.

(21) Appl. No.: 14/198,561

(22) Filed: Mar. 5, 2014

(65) Prior Publication Data
US 2014/0255693 A1    Sep. 11, 2014

Related U.S. Application Data

(60) Provisional application No. 61/775,446, filed on Mar. 8, 2013.

(51) Int. Cl.
*C04B 35/48*    (2006.01)
*C04B 35/49*    (2006.01)
(Continued)

(52) U.S. Cl.
CPC ............. *C04B 35/50* (2013.01); *C04B 35/486* (2013.01); *C04B 35/6225* (2013.01);
(Continued)

(58) Field of Classification Search
CPC ...... C04B 35/447; C04B 35/486; C04B 35/48; C04B 35/119; C04B 35/484
(Continued)

(56) References Cited

U.S. PATENT DOCUMENTS 4,767,730 A    8/1988  Soma et al.
5,047,373 A *  9/1991  Ketcham ............... C04B 35/486
                                                        501/103
(Continued)

FOREIGN PATENT DOCUMENTS

CN    1453242      11/2003
DE    3426886 A1    2/1985
(Continued)

OTHER PUBLICATIONS

Uchino. Materials Issues in Design and Performance of Piezoelectric Actuators: An Overview. Acta mater. vol. 46, No. 11, pp. 3745-3753, 1998.*
Lai et al, "Shape Memory and Superelastic Ceramics at Small Scales," Science, vol. 341, pp. 1505-1508, Sep. 2013.
(Continued)

*Primary Examiner* — Noah Wiese
(74) *Attorney, Agent, or Firm* — Theresa A. Lober

(57) ABSTRACT

Shape memory and pseudoelastic martensitic behavior is enabled by a structure in which there is provided a crystalline ceramic material that is capable of undergoing a reversible martensitic transformation and forming martensitic domains, during such martensitic transformation, that have an average elongated domain length. The ceramic material is configured as an oligocrystalline ceramic material structure having a total structural surface area that is greater than a total grain boundary area in the oligocrystalline ceramic material structure. The oligocrystalline ceramic material structure includes an oligocrystalline ceramic structural feature which has an extent that is less than the average elongated domain length of the crystalline ceramic material.

20 Claims, 8 Drawing Sheets

(51) Int. Cl.
    *C04B 35/50*     (2006.01)
    *C04B 35/486*     (2006.01)
    *C04B 38/10*     (2006.01)
    *C04B 35/622*     (2006.01)

(52) U.S. Cl.
    CPC ........ *C04B 35/62263* (2013.01); *C04B 38/10* (2013.01); *C04B 2235/3206* (2013.01); *C04B 2235/3208* (2013.01); *C04B 2235/3224* (2013.01); *C04B 2235/3225* (2013.01); *C04B 2235/3229* (2013.01); *C04B 2235/76* (2013.01); *C04B 2235/786* (2013.01); *C04B 2235/94* (2013.01); *C04B 2235/96* (2013.01); *Y10T 428/298* (2015.01)

(58) Field of Classification Search
    USPC .......................................... 501/103, 104, 105
    See application file for complete search history.

(56) References Cited

U.S. PATENT DOCUMENTS

| | | | |
|---|---|---|---|
| 5,284,698 A * | 2/1994 | Marshall | ............... C04B 35/486 |
| | | | 123/41.84 |
| 7,642,210 B2 * | 1/2010 | Okamoto | ............. B01D 53/885 |
| | | | 423/608 |
| 8,282,746 B2 | 10/2012 | Schuh et al. | |
| 9,018,117 B2 | 4/2015 | Schuh et al. | |
| 9,091,314 B2 | 7/2015 | Schuh et al. | |
| 2015/0354046 A1 | 12/2015 | Tuncer | |

FOREIGN PATENT DOCUMENTS

| | | |
|---|---|---|
| EP | 0388747 A2 | 9/1990 |
| EP | 1621251 A1 | 2/2006 |
| WO | 03104162 A1 | 12/2003 |
| WO | 2010053602 A2 | 5/2010 |
| WO | 2015073016 A1 | 5/2015 |

OTHER PUBLICATIONS

PCT/US2014/020938, PCT International Search Report, PCT/ISA/210 First Sheet, Second Sheet, Continuation of Second Sheet, and patent family annex sheet, Sep. 2014.
PCT/US2014/020938, PCT Written Opinion of the International Searching Authority, PCT/ISA/237 Cover Sheet, Box No. I, Box No. V, Box No. VIII, and Separate Sheet sheets 1-4, Sep. 2015.
PCT/US2013/030049, PCT International Search Report, PCT/ISA/210 First Sheet, Second Sheet, Continuation of Second Sheet, and patent family annex sheet, Jul. 2013.
PCT/US2013/030049, PCT Written Opinion of the International Searching Authority, PCT/ISA/237 Cover Sheet, Box No. I, Box No. V, Box No. VIII, and Separate Sheet sheets 1-2, Sep. 2015.
San Juan et al., "Superelasticity and Shape Memory in Micro- and Nanometer-scale Pillars," Adv. Mater., vol. 20, pp. 272-278, Dec. 2007.
San Juan et al., "Nanoscale shape-memory alloys for ultrahigh mechanical damping," nature nanotechnology, vol. 1, pp. 115-119, Supplementary Information pp. 1-12, Jul. 2009.
Ueland et al., "Superelasticity and fatigue in oligocrystalline shape memory alloy microwires," Acta Materialia, vol. 60, pp. 282-292, Jan. 2012.
Ueland et al., "Transition from many domain to single domain martensite morphology in small scale shape memory alloys," Acta Materialia, vol. 61, pp. 5618-5625, Jul. 2013.
Chen et al., "Size effects in shape memory alloy microwires," Acta Materialia, vol. 59, pp. 537-553, Oct. 2010.
Ueland et al, "Oligocrystalline Shape Memory Alloys," Adv. Mater., vol. 22, pp. 2094-2099 (1-6), Mar. 2012.
Chen et al., "Shape memory and superelasticity in polycrystalline Cu—Al—Ni microwires," Appl. Phys. Lett., vol. 95, pp. 171906 1-3, Oct. 2009.
Ueland et al., "Grain boundary and triple junction constraints during martensitic transfomation in shape memory alloys," J. Appl. Phys., vol. 114, pp. 053503 1-11, Aug. 2013.
U.S. Appl. No. 13/791,857, USPTO Office Action, PTOL-326, Office Action Summary, pp. 2-7, PTO-892, Search Notes, Apr. 2014.
U.S. Appl. No. 13/791,857, Response to USPTO Office Action, pp. 1-15, Oct. 2014.

* cited by examiner

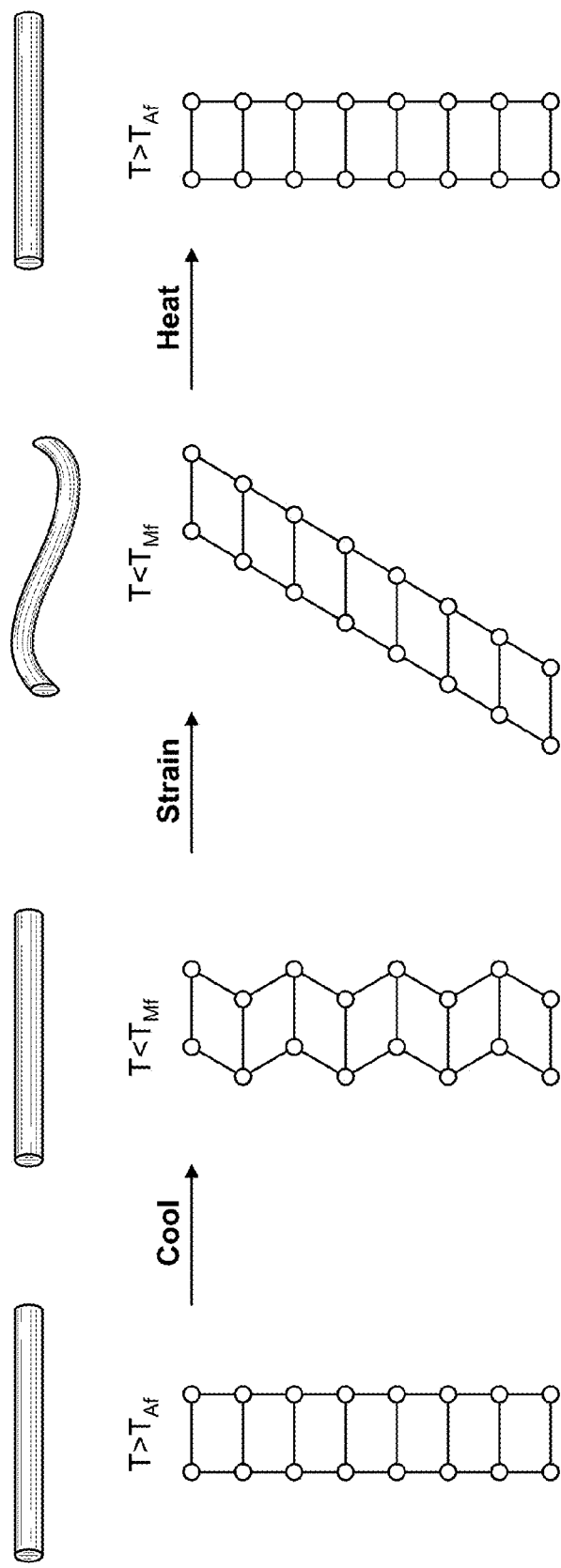

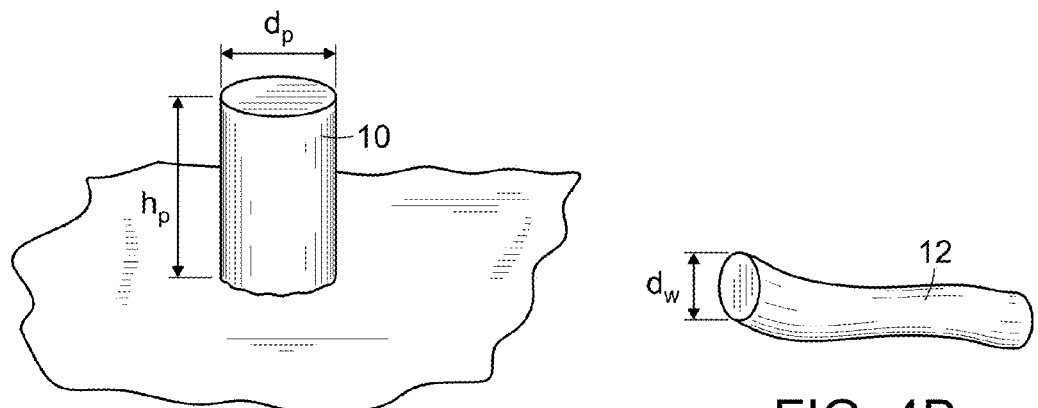
FIG. 4A
FIG. 4B
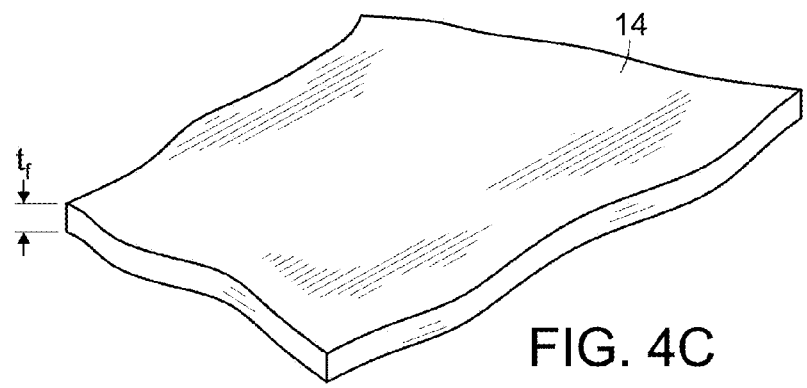
FIG. 4C
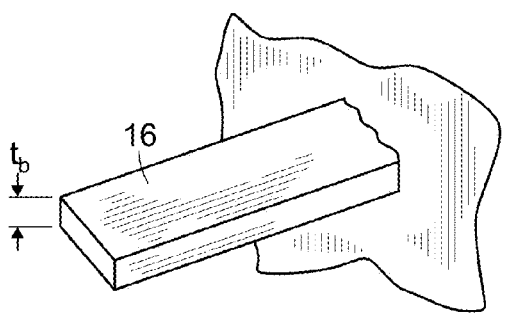
FIG. 4D
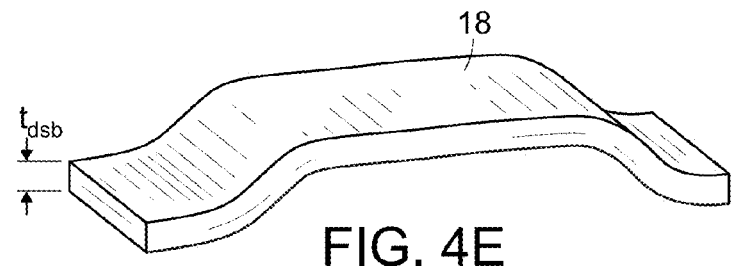
FIG. 4E

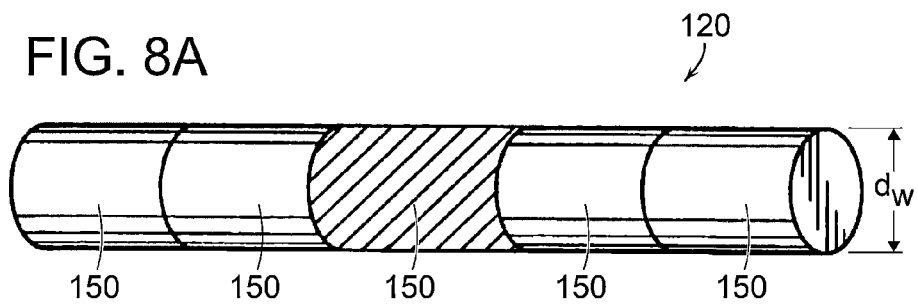
FIG. 8A
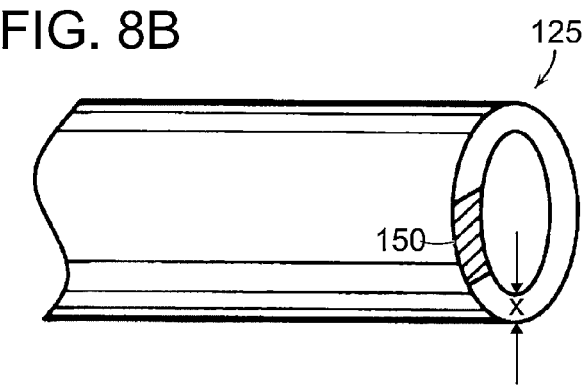
FIG. 8B
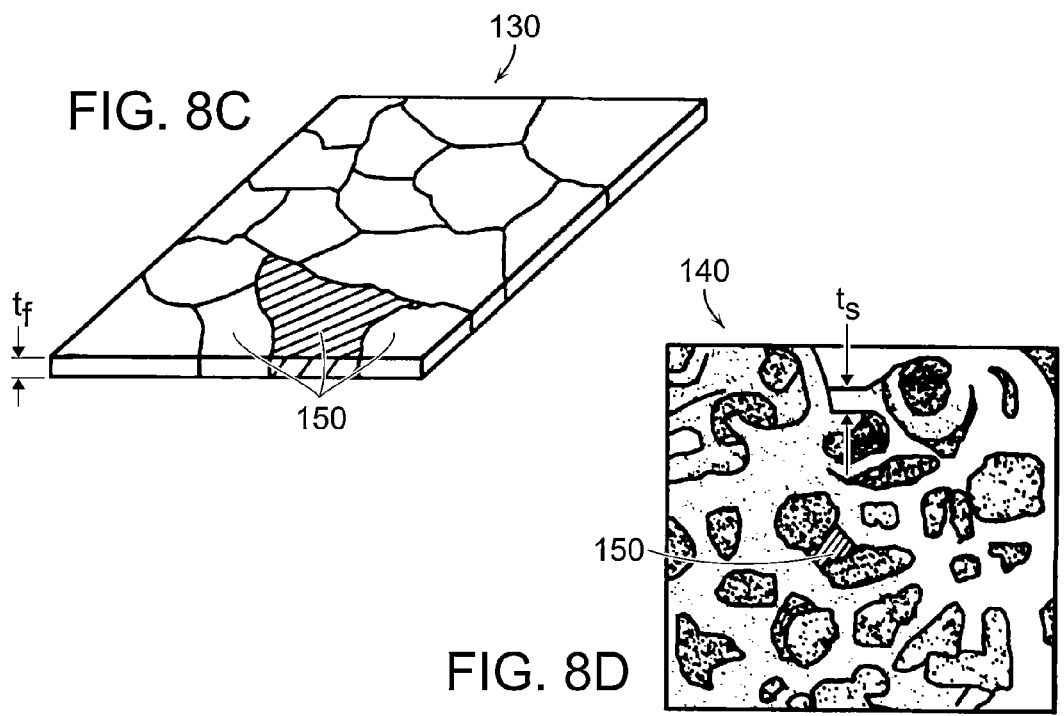
FIG. 8C
FIG. 8D

US 9,512,039 B2

OLIGOCRYSTALLINE CERAMIC STRUCTURES FOR ENHANCED SHAPE MEMORY AND PSEUDOELASTIC EFFECTS

CROSS-REFERENCE TO RELATED APPLICATIONS

This application claims the benefit of U.S. Provisional Application No. 61/775,446, filed Mar. 8, 2013, the entirety of which is hereby incorporated by reference.

BACKGROUND

This invention relates generally to shape memory materials, and more particularly relates to ceramic shape memory materials.

Shape memory materials are characterized as those materials that can undergo reversible transformation between two distinct morphological phases, namely, a martensitic phase and an austenitic phase. Such transformation can in general be induced by exposure to an external stimulus such as, e.g., a change in temperature or applied mechanical stress. In general, shape memory materials dissipate energy during transformation between martensitic and austenitic phases. This energy dissipation is due, in general, to the creation and motion of internal material interfaces during the phase transformations, and the amount of energy that is dissipated is directly related to the transformation stress and strain.

The most widely employed shape memory materials are metals, and in particular metal alloys. Shape memory alloys (SMAs) are well-known for their ability to transform between martensitic and austenitic phases. But conventional SMA structures are characterized by relatively low transformation stresses and correspondingly low energy dissipation capabilities. In contrast, some ceramic materials have been shown to be capable of exhibiting reversible martensitic transformation with high stresses, offering the prospect of improved energy dissipation over that of conventional SMAs and the ability to particularly address applications in, e.g., actuation, energy harvesting, and mechanical energy damping.

But it is found that in general, because the martensitic transformation and its associated shape change generally leads to substantial internal stresses, ceramics, which are in general brittle materials, have a tendency to crack during such transformation. As a result, ceramics can in general exhibit only very small shape memory strains and commensurately low energy dissipation levels, and tend to fracture or crack during such processes. Thus, although ceramic materials could in principle exhibit shape memory and superelastic properties with useful transformation shape recovery, such is not achievable due to the inherent brittle nature of such ceramic materials.

SUMMARY OF THE INVENTION

Shape memory and pseudoelastic martensitic behavior is enabled by a structure in which there is provided a crystalline ceramic material that is capable of undergoing a reversible martensitic transformation and forming martensitic domains, during such martensitic transformation, that have an average elongated domain length. The crystalline ceramic material is configured as an oligocrystalline ceramic material structure, in which the total surface area of the oligocrystalline ceramic structure is greater than the total area of the grain boundaries within the oligocrystalline ceramic structure. The oligocrystalline structure includes an oligocrystalline ceramic structural feature having an extent that is less than the average elongated domain length of the crystalline ceramic material.

With this configuration, the oligocrystalline ceramic material structure can undergo martensitic transformation cycling without the limitations of cracking and fracture that are characteristic of brittle ceramic materials. A combination of high strength, light weight, rapid response characteristic, large recoverable strain, and large energy damping render the ceramic structures provided herein particularly well-suited for many challenging applications. In particular, the ceramic structures can be controlled with a wide range of stimuli, including, e.g., mechanical, thermal, and other stimuli, for undergoing martensitic transformation.

The oligocrystalline ceramic structures are therefore well-suited as mechanical actuators, as mechanical couplings, as armor materials for dissipating energy when the material is impacted or loaded, in biomedical devices. Other features and advantages of the ceramic structures will be apparent from the following description and accompanying figures, and from the claims.

BRIEF DESCRIPTION OF THE DRAWINGS

FIGS. 1A-1D are schematic views of a cylindrical ceramic structure undergoing a martensitic transformation cycle exhibiting a shape memory effect;

FIGS. 4A-4H are schematic views of example ceramic material structures provided herein having a structural feature that can be controlled to be smaller than the elongated length of martensite domains that form in the structures during a martensitic transformation;

FIGS. 8A-8D are schematic views of example oligocrystalline ceramic material structures provided herein having a structural feature that can be controlled to be smaller than the elongated length of martensite domains that form in the structures during a martensitic transformation.

DETAILED DESCRIPTION

Figure 2C:
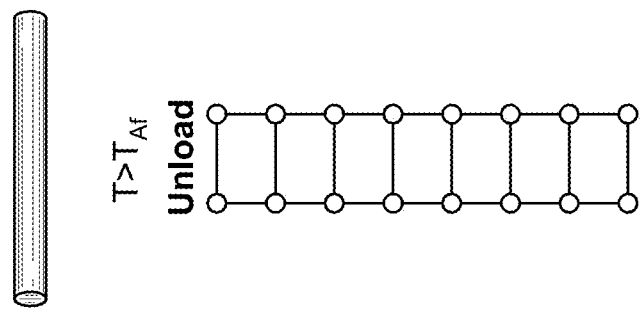
FIGS. 2A-2C are schematic views of a cylindrical ceramic structure undergoing a martensitic transformation cycle exhibiting pseudoelasticity.

The crystalline ceramic material structures provided herein exhibit the shape memory effect as well as pseudoelasticity without cracking or fracture, and with a high strain. These characteristics enable the application of the ceramic material structures provided herein to a wide range of applications that cannot be addressed by conventional brittle ceramic material structures.

The crystalline ceramic material structures provided herein include at least one crystalline ceramic structural feature that is configured to undergo the shape memory effect or a pseudoelastic effect. Both pseudoelasticity and the shape memory effect are due to martensitic transformations in the ceramic material structures. Martensitic transformations are diffusionless reversible transformations between two different crystal structures. During the transformations, the atoms of the ceramic material move small distances cooperatively, resulting in a different crystal structure, but the relative positions of the atoms with respect to each other do not change, i.e., the atoms do not change place with one another. The phase transformation is additionally associated with a volume or shape change. This shape change, specifically a shape change of the unit cell of the material morphology, is what leads to macroscopic shape changes of one or more ceramic structure features, as described in detail below.

In martensitic transformations of the crystalline ceramic structures provided herein, as with most phase transformations, such martensitic transformations can be thermally induced. There are four distinct temperatures that define stages of the martensitic transformation; martensite start temperature, $T_{Ms}$, martensite finish temperature, $T_{Mf}$, austenite start temperature, $T_{As}$, and austenite finish temperature, $T_{Af}$. With an example transformation cycle initiated at a relatively high temperature, above the austenite finish temperature, $T_{Af}$, at such a temperature the ceramic material is completely in the austenite phase. As the ceramic material is cooled from this start temperature, there is reached the martensite start temperature, $T_{Ms}$, at which the austenite phase begins to transform to the martensite phase. If cooling is continued below the martensite finish temperature, $T_{Mf}$, then all of the austenite is transformed to martensite, leaving a fully martensite material. This austenite-to-martensite transition is known as the forward transformation. Now if this fully-martensitic material is heated, austenite will begin to form upon reaching the austenite start temperature, $T_{As}$, and as the temperature is further increased, above the austenite finish temperature, $T_{Af}$, only an austenite phase will remain. This martensite-to-austenite transition is known as the reverse transformation. The hysteresis that is characteristic in the forward and reverse transformations is due to a balance between the chemical driving force that promotes the phase transformation and the elastic energy created by the shape change that hinders the transformation. In general, the austenite start temperature, $T_{As}$, can be higher or lower than the martensite start temperature, $T_{Ms}$; there is no universally-required temperature condition.

Considering the phenomena known as the shape memory effect (SME), the SME results from martensitic transformation and is a shape change that can be fully recovered upon heating. The mechanism for the shape memory effect can be described in terms of the crystal structures of the austenite and martensite phases. Referring to FIGS. 1A-1D, there is shown a schematic of a cylindrical ceramic structure undergoing such SME. In a first example step, as shown in FIG. 1A, a selected, so-called 'memory shape' of a ceramic material structure is set, under stress, in the austenitic state, at a temperature above the austenite finish temperature, $T_{Af}$. Then, referring to FIG. 1B, upon cooling of the structure from the austenite phase, the ceramic material transforms into martensite but it does so in a self-accommodating way, so that the overall shape of the structure does not change. This involves many different so-called variants, which have the same martensitic crystal structure but with different alignments.

Then, as shown in FIG. 1C, if a stimulus, e.g., a mechanical stress, is applied to the structure so that the ceramic martensite is now deformed, some variants will become preferred, due to the applied stress, and those preferred variants will remain and dominate even upon removal of the stimulus. Then, as shown in FIG. 1D, when the ceramic structure is heated again to a temperature above the austenite finish temperature, $T_{Af}$, the martensite transforms back to austenite and the structure recovers the original selected memory shape.

Figure 2B:
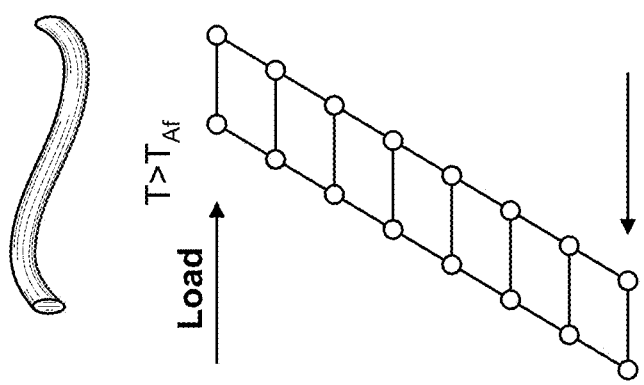
Figure 2A:
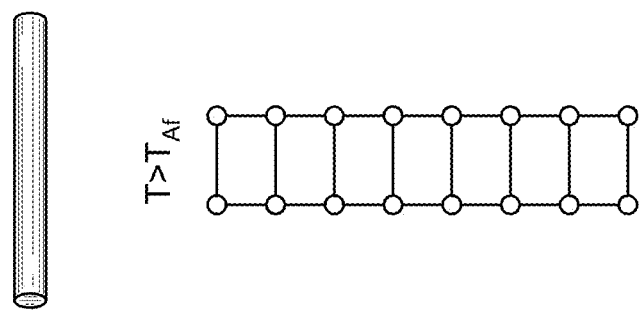

Now considering the phenomenon known as pseudoelasticity, such phenomenon can be induced in ceramics by the application of mechanical stress, rather than thermal stimulus. Referring to FIGS. 2A-2B, if a cylindrical ceramic material structure is mechanically stressed while in the austenitic state, at a temperature above the austenite start temperature, $T_{As}$, then the austenite will be transformed into martensite. Once the mechanical stress load is removed, as shown in FIG. 2C, the ceramic material transforms back to the austenite phase, since that is preferred thermodynamically, and reverts back to the original shape existing in the austenitic state.

Figure 3:
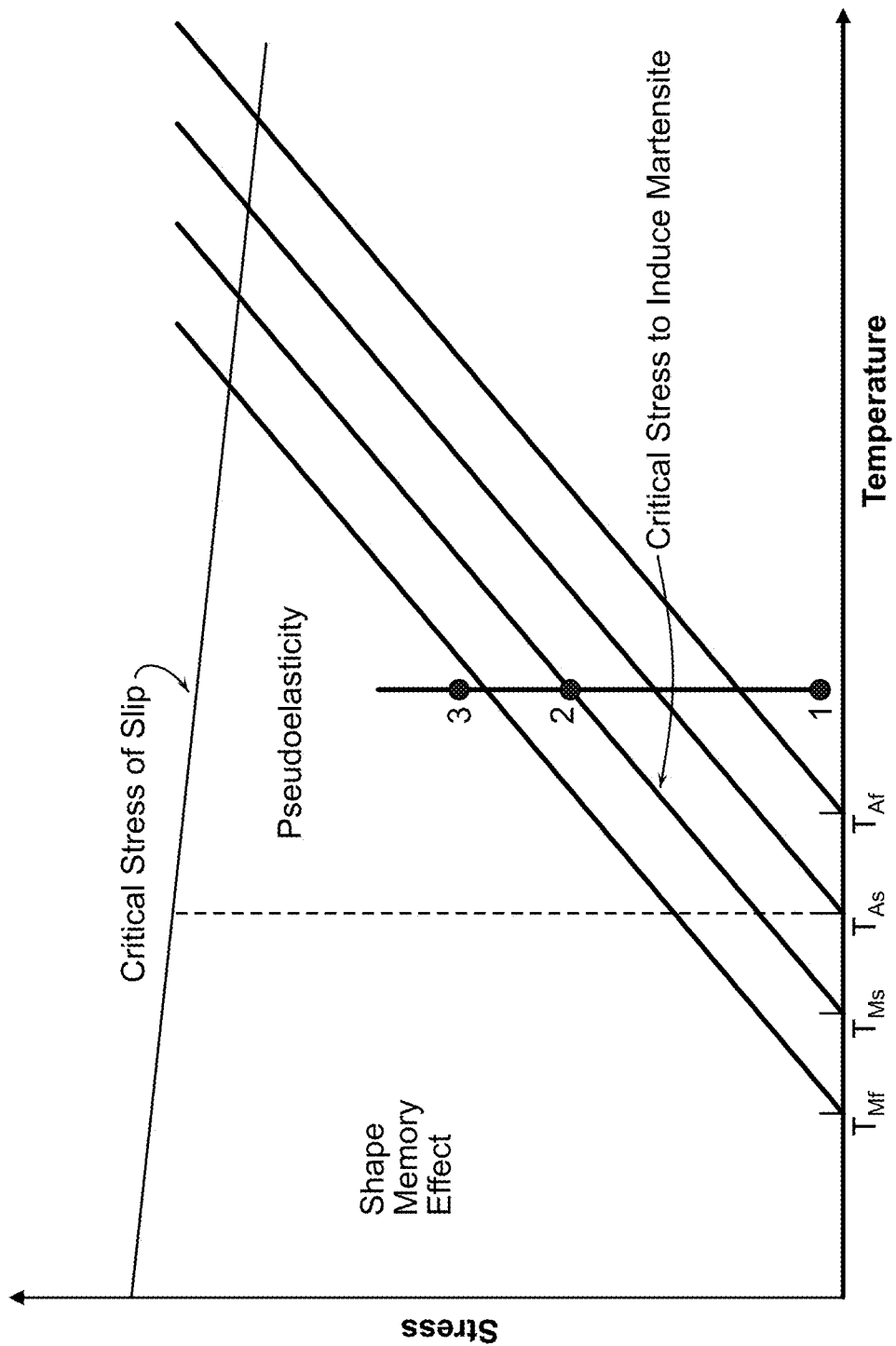
FIG. 3 is a general plot of ceramic material stress as a function of applied temperature, indicating various temperature regimes for the martensitic and austenitic phases of material.

To obtain pseudoelastic behavior, the stress that is applied to induce this austenite-to-martensite transformation must be less than the critical stress that induces slip in the ceramic material. If slip in the material occurs before the phase transformation, then the deformation will not be recoverable upon mechanical unloading and will result in permanent deformation of the ceramic material. FIG. 3 is a typical stress-temperature diagram in which the lines of positive slope separate the plot into austenite (right) and martensite (left) regions. There are four lines for each of the important transformation temperatures. Starting in the plot at the point labeled point 1, at which the ceramic is in the fully austenitic state, and applying a stress to the material, then the material passes through the $T_{Af}$ and $T_{As}$ lines without phase change because the material remains austenite. Once there is reached the stress level that passes the line for martensite start temperature, $T_{Ms}$, labeled point 2, then the stress-induced martensite transformation starts and completes after passing through the line for martensite finish temperature, $T_{Mf}$, where the material will be completely martensite, labeled point 3. If the ceramic material structure is then mechanically unloaded, the structure transforms back to the austenite phase and the original shape of the structure. The line with negative slope indicates the critical stress required for slip, and is preferably greater than the stress required to induce the martensitic transformation, σMs; otherwise, pseudoelasticity will not be observed in the ceramic structure.

The ceramic material structures provided herein all are capable of exhibiting this pseudoelasticity phenomenon, as well as the shape memory effect phenomenon, because they all can undergo martensitic transformations between a martensitic phase and an austenitic phase, and can do so reversibly, over a sequence of transformation cycles.

Table I below lists examples of crystalline ceramic materials that can be employed in ceramic material structures provided herein.

TABLE I

| Material | Austenite Phase | Martensite Phase | Shear Angle(°) | ΔV/V |
|---|---|---|---|---|
| ZnS | Wurtzite (H) | Sphalerite (3C) | 19.5 | 0.001 |
| $Mg_2SiO_4$ | (a) Olivine | Spinel, γ (Ringwoodite) | 19.9 | −0.085 |
|  | (b) Spinel, γ | β-phase | 40.9 | 0.024 |
| $Mg_2GeO_4$ | Olivine Germanate | Spinel, γ Germanate | 19.5 | −0.087 |
| $MgSiO_3$ | (a) Orthoenstatite | Clinoenstatite | 13.3 | 0.001 |
|  | (b) Protoenstatite | Clinoenstatite | 13.3 | 0.001 |
| $Fe_{0.9}Mg_{0.1}SiO_3$ | Orthoferrosilite | Clinoferrosilite | 13.3 | −0.003 |
| $CaSiO_3$ | (a) Parawollastonite | Wollastonite | 13.4 | 0.001 |
|  | (b) Parawollastonite | Bustamite | 13.7 | −0.060 |
| $Ca_2SiO_4$ | Ortholarnite, $\alpha'_L$ | Clinoarnite | 4.5 | −0.035 |
| $(Ca_2Al_3Si_3)_{12}(OH)$ | Zoisite | Clinozoisite | 8.8 | 0.038 |
| $AlSiO_5$ | Sillimanite | Kyanite | 26.1 | −0.110 |
| $Fe_2Al_4O_2[SiO_4]_2(OH)_4$ | Chloritoid monoclinic | Chloritoid triclinic | 7.1 | −0.021 |
| $(Al, Mg)_8(Al, Si)_6O_{20}$ | Sapphirine monoclinic | Sapphirine triclinic | 21.4 | 0.028 |
| $TiO_2$ | (a) Anatase | TiO2 II |  | −0.048 |
|  | (b) Rutile | TiO2 II |  | −0.019 |
| $CaCO_3$ | Calcite | Aragonite |  | 0.060 |
| $ZrO_2$ | Baddeleyite tetragonal | Baddeleyite monoclinic | 8.8 | 0.031 |

Additional example crystalline ceramic systems that can be employed as materials in the ceramic structures provided herein are listed below in Table II.

TABLE II

| Ceramic System | Phase Transformation | Ceramic System | Phase Transformation |
|---|---|---|---|
| Mg-PSZ | Tetragonal to Orthorhombic | Mg-PSZ | Orthorhombic to Monoclinic |
| Dicalcium silicate ($Ca_2SiO_3$) | Orthorhombic to Monoclinic | Dicalcium silicate ($Ca_2SiO_3$) | Monoclinic to Orthorhombic |
| $LaNbO_4$ | Tetragonal to Monoclinic | $YNbO_4$ | Tetragonal to Monoclinic |
| $Al_2O_9$ | Orthorhombic to Monoclinic | Lanthanide sesquioxide ($Ln_2O_3$) | Monoclinic to Cubic |
| Enstatites ($MgSiO_3$) | Orthorhombic to Monoclinic | Enstatites ($MgSiO_3$) | Orthorhombic to Monoclinic |

In the materials described in Table I and Table II above, selected compositions can be produced and dopants can be added as-desired for a given application. For example, a ceramic material such as $ZrO_2$ can be doped with a selected dopant, such as cerium, yttrium, hafnium, calcium, ytterbium, europium, and magnesium, or other selected dopant.

In a crystalline ceramic structure formed of a ceramic material such as one of the example ceramic materials in Table I and Table II, there is provided one or more crystalline ceramic structural features which, when the structure is subjected to a suitable stimulus, such as a thermal or mechanical stimulus, will exhibit a reversible martensitic phase transformation, with shape recovery properties, without cracking or sustaining other debilitating mechanical damage. This suppression of cracking during transformation is achieved through the imposition of feature dimensions that correspond to the dimensions of martensitic transformation domains in the structure.

As a martensitic transformation cycle commences in a crystalline ceramic structure, the transformation proceeds in local material regions defined as domains, also known and lathes, plates, variants, and platelets. These ceramic domains form as the transformation is initiated and proceeds, with a characteristic domain size that depends directly on a range of factors, including the ceramic material composition and crystallographic orientation, the loading state of the ceramic structure, and the temperature of the structure during the transformation. In general, elongated martensitic domains in a crystalline ceramic can extend from as small as about 0.01 microns to as large as 100s of microns. Because the elongated domains represent material that has changed shape and/or volume compared with the surrounding untransformed matrix of ceramic material, domains cause significant internal material mismatch stresses. If these stresses become sufficiently high, such stresses can cause cracking of a brittle crystalline ceramic material during the transformation. Similarly, when two or more domains are present in a ceramic material, the domains can compete with one another, causing overlapping stress fields that can cause or exacerbate cracking in a ceramic material during the transformation. It is herein recognized that domain stress within a transforming crystalline ceramic material is that condition which causes the cracking of conventional ceramic shape memory material structures during martensitic transformation.

It is discovered herein that free surfaces of ceramic material can relieve the stresses associated with domains that form in a crystalline ceramic structure during a martensitic transformation. Therefore, if the domains that form during a martensitic transformation of a ceramic material are relatively near to, or in proximity to, or directly adjacent to, a free surface of the ceramic material, the domains in general produce less internal mismatch stress than if the domains are in the bulk of the material, away from free surfaces. With the internal mismatch stress sufficiently reduced by domain location near a free surface, the ceramic material can then proceed through the martensitic transformation cycle without cracking or fracture.

This condition of domain location near to or at a free surface is achieved in the crystalline ceramic structures provided herein by imposing on at least one feature of a ceramic structure a size constraint, wherein it is required that the feature be no larger, and preferably smaller, in extent than the elongated length of the domains that form in the structural feature during a martensitic transformation of the crystalline ceramic material of which the structural feature is composed. In general, domains form during a martensitic transformation as elongated plate-like structures, with a characteristic elongated domain length, herein referring to the length that is associated with the elongated dimension of the domain structure. This elongated domain length is characteristic of the material composition and transformation conditions, as explained above. As the plate-like domains grow during a martensitic transformation, the domains due so primarily by thickening; the elongated domain length does not substantially change during the transformation.

Therefore, to meet the condition that a ceramic structure feature be no larger in extent than the characteristic size of the domains that form in the structural feature, there can be imposed the condition that the ceramic structural feature be no larger than the average caliper length of the elongated dimension, or length, of martensite domains in a ceramic structure during martensitic transformation. For example, this average elongated domain length can be specified as that elongated domain length that is measured for a ceramic material that is transformed to a volume fraction of 50% martensite and 50% austenite. This quantitative measurement can be determined experimentally, e.g., by bright field transmission electron microscopy (TEM) conducted on a bulk sample of a ceramic material of interest, to directly image the martensitic domains. With this direct imaging, there can be determined the precise size of martensitic domains for a ceramic material of interest, and a ceramic structural feature size less than the martensitic domain size can be specified. For many crystalline materials of interest, the martensitic domain size can be determined from scientific literature. For example, it is generally known from scientific literature publications that the elongated length of martensitic domains in the crystalline ceramic $ZrO_2$ is about 5 microns.

By meeting the condition that the crystalline ceramic structure include a feature that is smaller than the elongated length of martensitic domains in the ceramic structure, the domains that form in the ceramic structure during a martensitic transformation of the ceramic material are near to a free surface, e.g., less than about one elongated domain length away from a surface, or are in contact with at least one free surface of the structural feature material. As a result, the domains do not in general result in cracking of the ceramic material during a martensitic transformation because the domains cannot produce a level of stress that is sufficiently high for such cracking. So long as the average elongated length of the martensitic transformation domains of the ceramic material structural feature are larger than the structural feature extent, cracking of the ceramic material during martensitic transformation of the feature is suppressed through a plurality of martensitic transformation cycles, e.g., at least two cycles, at least five cycles, or at least ten cycles.

Ceramic structural features that can be controlled with a feature size that is less than the extent of a martensitic transformation domain can take any geometry suitable for a given application. No particular feature orientation or geometry is required, and no particular feature size is required. But at least one feature of the ceramic structure is preferably characterized by an extent that is less than the extent of a martensitic transformation domain that forms in the feature during a martensitic transformation of the ceramic material.

Figure 4F:
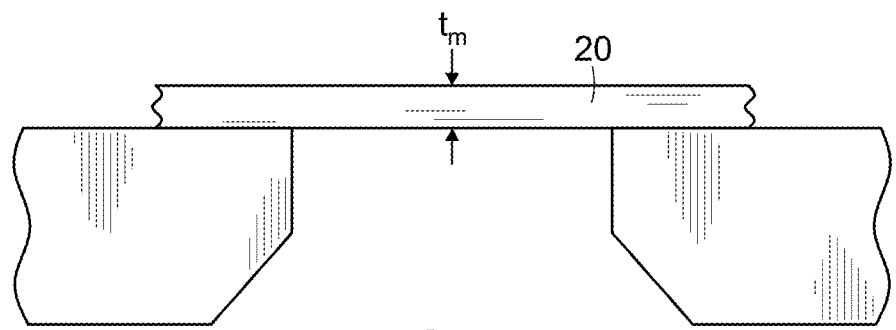
Figure 4G:
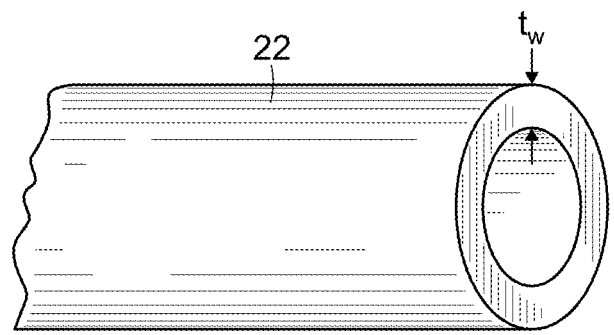

Referring to FIGS. 4A-4H, there are shown a range of examples of structures that can be employed as the ceramic structural features provided herein. As shown in FIG. 4A, the ceramic structure can be provided as a pillar 10 or other such structure that finds support at one end. The pillar is characterized by a first feature that is the pillar diameter, $d_p$, and is characterized by a second feature that is the pillar height, $h_p$. If either or both of these pillar features are smaller than the extent of martensitic domains forming in the pillar, then the pillar will not crack during martensitic transformation of the pillar.

The ceramic structure can further be provided as a narrow cylindrical structure, or wire-like structure 12, shown in FIG. 4B. Here the diameter of the wire, $d_w$, is a structural feature that can be smaller than the extent of martensitic domains forming in the wire, whereby the wire does not crack during martensitic transformation of the wire. Cylindrical wire-like structures such as fibers can also be employed in this manner. Such fibers and wires or other cylindrical objects can be employed in a bundle, cable, braid, or woven sheet for enabling actuation of the group of wires, fibers, or other cylindrical objects.

Alternatively, as shown in FIG. 4C, the ceramic structure can be provided as a thin film, plate, coating, or layer 14, having a film thickness, $t_f$, that is a structural feature that can be smaller than the extent of martensitic domains forming in the film during martensitic transformation. As shown in FIGS. 4D and 4E, the ceramic structure can be provided as a cantilever beam 16 or doubly-supported beam 18, respectively. The thickness of the cantilever beam 16, $t_b$, and the thickness of the double supported beam, $t_{dsb}$, are structural features that can be smaller than the extent of martensitic domains forming in the cantilever beam and doubly-supported beam respectively, during martensitic transformation.

Figure 4H:
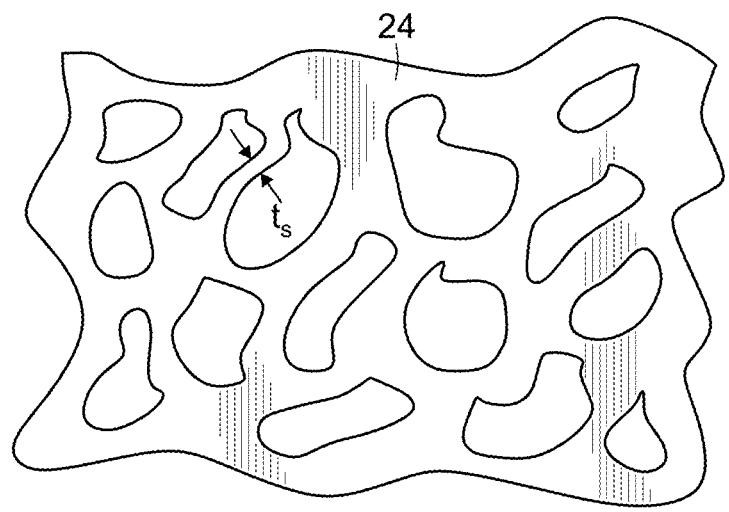

In FIG. 4F there is shown a side view of a free-standing membrane 20, having a membrane thickness, $t_m$, that is a structural feature that can be smaller than the extent of martensitic domains forming in the membrane. This example can be extended to, e.g., tubular structures like that shown in FIG. 4G. Here is provided a tube 22 having a tube wall thickness, $t_w$, that is a structural feature which can be smaller than the extent of martensitic domains forming in the tube during martensitic transformation. In FIG. 4H there is shown a foam structure 24, having openings in three dimensions that are supported by struts throughout the structure. The thickness of a strut, $t_s$, is a structural feature that can be smaller than the extent of martensitic domains forming in the foam structure.

These example structures demonstrate that any in a range of structural features can be controlled to have a feature extent that is smaller than martensitic domains forming in the ceramic structure during a martensitic transformation of the structure. The extent of the feature can be, e.g., less than about 100 microns, 50 microns, or smaller, even as small as 1.0 microns, 0.5 microns, 0.1 microns, or smaller, to meet the requirement, and given the geometry and arrangement of the crystalline ceramic structure. With these feature sizes, superior martensitic transformation strain level, e.g., greater than at least about 1%, and for many applications, greater than at least about 2% is achieved, in dramatic contrast to the much lower strain values that are typically achieved with conventional macro-scale ceramic materials.

With these ceramic structure features, it is discovered that the ceramic structures provided herein can demonstrate superior damping capacity during pseudoelastic cycling. Each martensitic transformation in a pseudoelastic cycle dissipates energy in a ceramic material structure. The loss factor, η, that is associated with such energy dissipation, can be expressed as:

$$\eta = \frac{\Delta W}{\pi W_{max}}; \quad (1)$$

where ΔW is the energy dissipated in the ceramic structure per unit volume during one pseudoelastic cycle, and $W_{max}$ is the maximum stored energy per unit volume over the cycle. The energy dissipated during one pseudoelastic cycle, ΔW, is equal to the area within a plot of the pseudoelastic stress-strain curve for the cycle, and the maximum stored energy per unit volume over the cycle, $W_{max}$, is the area under a plot of the pseudoelastic stress-strain curve for the cycle, up to the maximum strain. This energy dissipation loss factor, η, can be normalized to enable comparison between different materials with an expression for merit index for stiffness design, to account for the elastic modulus, or Young's modulus, E, of a material, as:

$$\text{Merit Index} = E^{1/2}\eta. \quad (2)$$

In crystalline ceramic structures provided herein, with a features extent smaller than an elongated martensitic domain size that is characteristic of the ceramic, there can be achieved loss factor and merit index values that surpass those of conventional ceramic structures. For example, a loss factor of at least about 0.13 and a merit index of at least about 1.84 can be achieved for the crystalline ceramic structures, and for many structures, a loss factor of at least about 0.18 and a merit index of at least about 2.5 can be achieved.

It can be preferred for many applications that the ceramic structures provided herein be formed as oligocrystalline ceramic structures rather than single crystal ceramic structures or polycrystalline ceramic structures. An oligocrystalline ceramic structure is herein defined as a structure of polycrystalline ceramic morphology, in which the total surface area of the structure is greater than the total area of the polycrystalline grain boundaries within the ceramic structure. This condition results in the grains of the ceramic material structure being coordinated predominantly by unconfined free surfaces rather than by rigid boundaries with other grains within the structure.

An oligocrystalline ceramic structure provided herein with a feature size that is less than a martensitic transformation domain extent is capable of an increased achievable transformation strain well above that of conventional ceramic structures, as well as a significant reduction in the stress required for stress-induced martensitic transformation. As the selected feature extent of the ceramic structure is reduced below the grain size of the ceramic structure material, the achievable transformation strain of the structure increases as the feature extent is further decreased. As the selected feature extent of the ceramic structure is reduced below the grain size of the ceramic structure material, the required stress for stress-induced martensitic transformation decreases as the feature extent is further decreased.

Figure 5A:
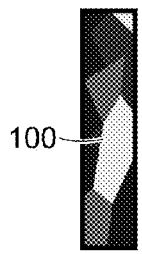
FIG. 5A is a schematic view of a conventional polycrystalline ceramic structure.
Figure 5B:
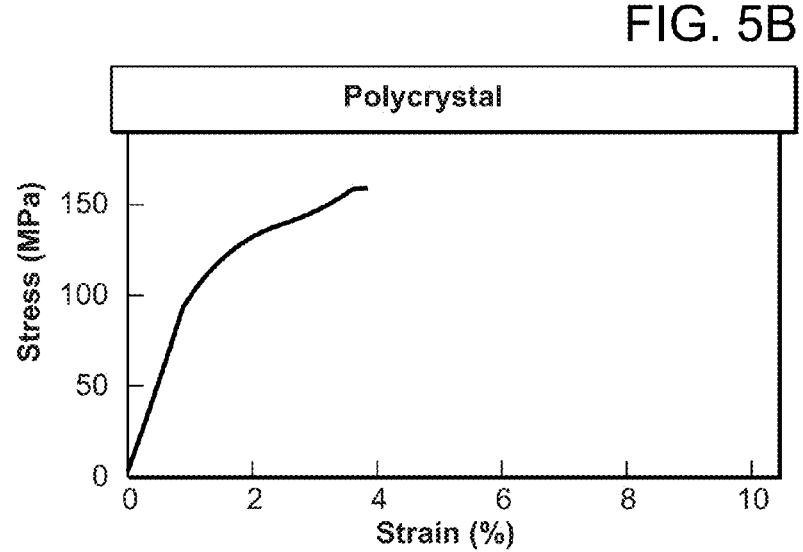
FIG. 5B is a stress-strain curve that is characteristic for martensitic transformation of the polycrystalline ceramic structure of FIG. 5A.

The superelastic characteristics of an oligocrystalline ceramic structure lie between those of a single-crystalline ceramic structure and those of a polycrystalline ceramic structure, but can approach those of the single-crystalline ceramic structure. For a conventional polycrystalline ceramic structure 100, like that of FIG. 5A, the stress-strain curve for a martensitic transformation, shown in FIG. 5B, exhibits fracture failure of the structure. In a polycrystalline ceramic material, each grain can contain atoms that are in a different crystallographic orientation with respect to each other. Given that the grains are randomly oriented within the ceramic material, then during a martensitic transformation, neighboring grains can change shape in opposing directions, causing internal stress concentrations in the ceramic material. These stress concentrations can lead to intergranular fracture and cracking of the ceramic material.

Figure 6A:
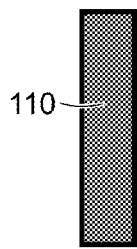
FIG. 6A is a schematic view of a single crystal ceramic structure.
Figure 6B:
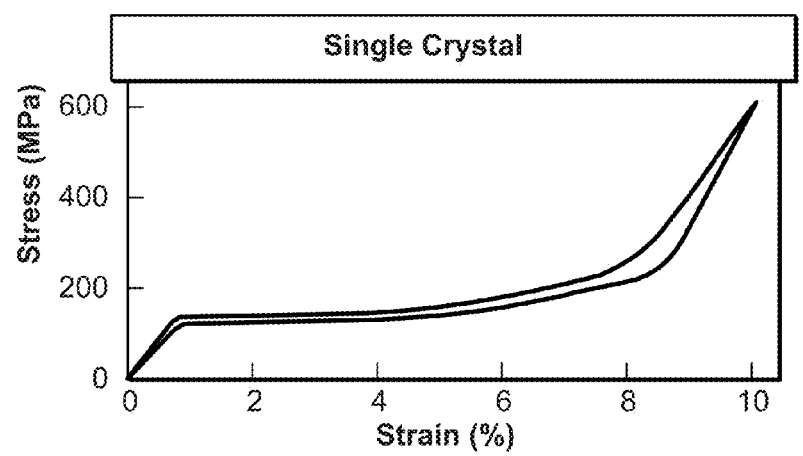
FIG. 6B is a stress-strain curve that is characteristic for martensitic transformation of the single crystal ceramic structure of FIG. 6A.
Figure 7A:
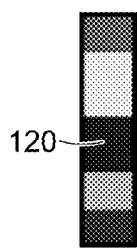
FIG. 7A is a schematic view of an oligocrystalline crystal ceramic structure.
Figure 7B:
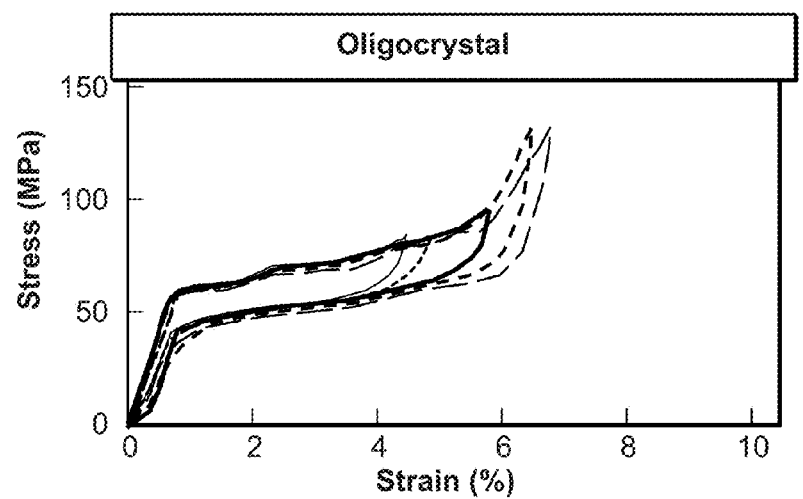
FIG. 7B is a stress-strain curve that is characteristic for martensitic transformation of the oligocrystalline ceramic structure of FIG. 7A.

For a single-crystalline ceramic structure 110, like that of FIG. 6A, the stress-strain curve for a martensitic transformation, shown in FIG. 6B, exhibits hysteretic cycling in a forward and reverse transformation with no cracking or failure. For an oligocrystalline ceramic structure 120, like that of FIG. 7A, the stress-strain curve for a martensitic transformation, shown in FIG. 7B, exhibits hysteretic cycling in a forward and reverse transformation like the single-crystalline structure, but includes junctures during the transformation in which transformation strain must be accommodated due to, e.g., grain boundaries and triple junctions. But the stress-strain characteristic of the oligocrystalline ceramic structure far surpasses that of a polycrystalline structure by enabling forward and reverse transformation without cracking, and without requiring single crystal morphology.

Referring to FIGS. 8A-8D, the oligocrystalline ceramic structure can be formed in any suitable geometry like those described above in connection with FIG. 4. Here, for example as shown in FIG. 8A, there can be produced an oligocrystalline ceramic fiber or wire 120. The wire is characterized by a diameter, $d_w$, that is the feature of the wire that is less than martensitic domain extent, and that is no larger than the extent of a grain 150 of the wire. As a result, grains 150 span the entire wire diameter. This arrangement results in a so-called bamboo wire structure in which grains generally spanning the diameter of the wire are configured along the length of the wire. This wire configuration can be extended to wire-like structures as well as pillars and other generally cylindrical structures. This configuration can be further extended to an oligocrystalline ceramic tube structure 125 having a tube wall that includes ceramic grains 150 which span the thickness, X, of the tube wall.

Referring to FIG. 8C, there can be employed an oligocrystalline ceramic planar structure 130 characterized by a thickness, $t_p$, that is the feature of the planar structure that is less than martensitic domain extent, and that is no larger than the extent of a grain 150. As a result, grains generally span the entire thickness of the structure. This structure can be employed for producing a film, multiple layers, cantilever beams, doubly-supported beams, free-standing membranes, and other planar structures. Referring to FIG. 8D, there is shown an open cell foam structure 140, having a strut extent, $t_s$, that is the feature of the open cell foam structure that is less than martensitic domain extent. The strut extent is also no larger than the extent of a grain 150 of the structure, whereby grains generally extend across the entire strut span of the foam 140. These example structures demonstrate a range of possible geometries for an oligocrystalline ceramic structure.

Turning now to methods for producing the crystalline ceramic structures and their feature dimensions described herein, no particular production method is required, and any suitable process can be employed, including, e.g., powder processing, sintering, solidification, sol-gel techniques, and other processes. Melt spinning, inviscid melting, Taylor drawing, and other suitable methods can be employed for wire and wire-like ceramic material structures. A ceramic structure geometry and feature or features of a selected size or extent can be formed in situ during the production process or can be produced from a bulk ceramic by a suitable technique, such as machining, micromachining, microfabrication processes, such as ion beam milling, or other technique.

In one example of such a machining process, first there can be employed a co-precipitation technique that enables control of the ceramic composition from which the ceramic structure is machined. In such a technique, e.g., metal salts of selected elements are mixed and co-precipitated, and then ball milled, dried, and calcined into a powder. The powder can then be pressed into a selected bulk, e.g., a disk, with uniaxial pressure, and then sintered, in the conventional manner. The sintering time is controlled to adjust the grain size of the bulk structure, with longer sintering duration producing grain growth. After sintering of the bulk ceramic, a ceramic material structure can be formed from the bulk by, e.g., focused ion beam milling or other mechanical process. This enables the production of a ceramic material structure with high precision and controlled composition in the formation of, e.g., pillars, cantilever beams, bridges, and other crystalline ceramic micromechanical structures. In addition, there can be employed processes for forming ceramic structures as a layer or layers, including thin films, free-standing membranes, and other layered structures, and composite structures such as foams. In one example process, there can be employed pulsed-laser deposition conditions for vaporization of ceramic material from a target bulk and subsequent vapor deposition of the vapor species onto a selected substrate or other surface. The resulting vapor-deposited material layer can be oligocrystalline, depending on the vaporization and deposition parameters. Other deposition techniques can be employed, e.g., chemical vapor deposition, in which a ceramic material layer is formed on a substrate or other structure by reaction of gaseous precursor species for deposition. Whatever deposition process is employed, layers can be formed on any suitable structure, e.g., a foam structure such as that shown in FIG. 4H. Other than vapor-based processing, here there can further be employed coating techniques, such as with a slurry of selected ceramic material, followed by drying and sintering in the conventional manner. Such processes can be employed to form foam struts having a selected ceramic material composition, extent, and geometry.

With these ceramic structure fabrication processes, there can be formed a wide range of oligocrystalline ceramic structures that meet the dimensional criteria described above for achieving superior shape memory and pseudoelastic cycling capabilities for actuation, sensing, energy harvesting and conversion, and mechanical damping applications. The unique combination of high strength, light weight, rapid response characteristic, large recoverable strain, and large energy damping render the ceramic structures provided herein particularly well-suited for many challenging applications. In particular, the crystalline ceramic structures can be controlled with a wide range of stimuli, including, e.g., mechanical, thermal, and other stimuli, for undergoing martensitic transformation. The crystalline ceramic structures can therefore be arranged to accept a selected input for martensitic transformation; for example, the structure can be arranged to accept mechanical input for inducing martensitic transformation.

Thus, with a wide range of suitable martensitic transformation control stimuli, the ceramic material structures can be employed for many applications, e.g., as mechanical actuators, as mechanical couplings, as armor materials for dissipating energy when the material is impacted or loaded, and in biomedical devices.

Experimental Example of Oligocrystalline Ceramic Feature with Martensitic Transformation A crystalline ceramic material was formed by mixing oxides of zirconium and cerium in a range of ratios between 0% and 30% cerium. Each mixture was ball-milled to homogenize the two components. The ceramic powder was pressed and sintered uni-axially to produce bulk polycrystalline ceramic material. The average grain size of the bulk ceramic material was 1.5 microns. Differential scanning calorimetry (DSC) data from various compositions of the bulk ceramic material determined the transformation temperatures.

With this experimental bulk ceramic manufacturing process, a bulk ceramic material having a grain size of 1.5 μm was produced, with a composition of 8 mol % $CeO_2$, 0.5 mol % $Y_2O_3$, and 91.5 mol % $ZrO_2$. The martensitic transition temperatures of this bulk ceramic material sample were $T_{As}=403°$ C., and $T_{Af}=430°$ C. The martensite transformation temperatures were unable to be measured, but were extrapolated from data from other compositions to be near room temperature. The mechanical testing temperature was 20° C., so the material was assumed to not be fully martensite, but because the testing temperature was below the austenite start temperature it was expected that the structure formed out of the material would demonstrate the shape memory effect.

A ceramic pillar structure was milled into the ceramic bulk by focused ion beam milling. The pillar diameter was selected to be the structural feature that would have an extent less than the average elongated martensitic domain length of the material and that would be oligocrystalline. The average elongated martensitic domain length was determined to be about 5 μm. Given that the material grain size was measured to be about 1.5 μm, the pillar was milled to have a diameter that was less than about 5 μm. The pillar diameter was milled to be about 0.6 μm and the pillar height was 4.4 μm. With this geometry, the diameter of the pillar was similar to the size of the polycrystalline grains in the pillar and the height of the pillar was greater than the size of polycrystalline grains in the pillar, and therefore, the pillar was an oligocrystalline ceramic structure.

The milled pillar was subjected to martensitic transformation cycling by uni-axial compression with a nanoindenter equipped with a blunt, 20 μm conospherical tip. An optical microscope was used for course positioning while in-situ scanning probe microscopy was used for fine positioning of the tip on a selected pillar top face across the diameter of the pillar. Loading rates were varied between 1 μN/s and 500 μN/s, with the load applied in open-loop load control.

Figure 9A:
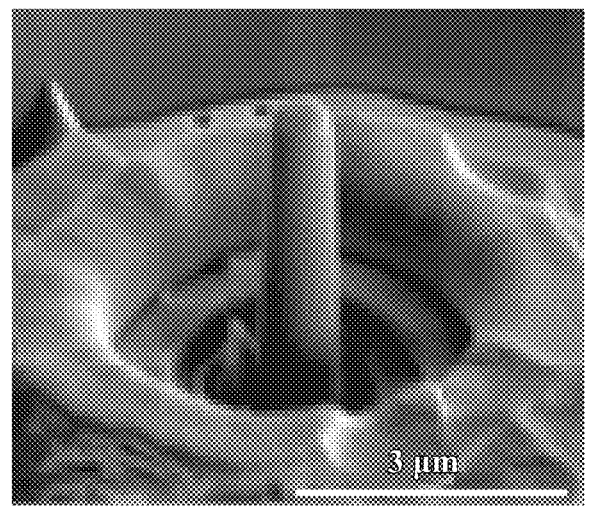
FIGS. 9A and 9B-9C are scanning electron micrograph images of an experimental oligocrystalline pillar before and after martensitic transformation cycling, respectively.
Figure 9B:
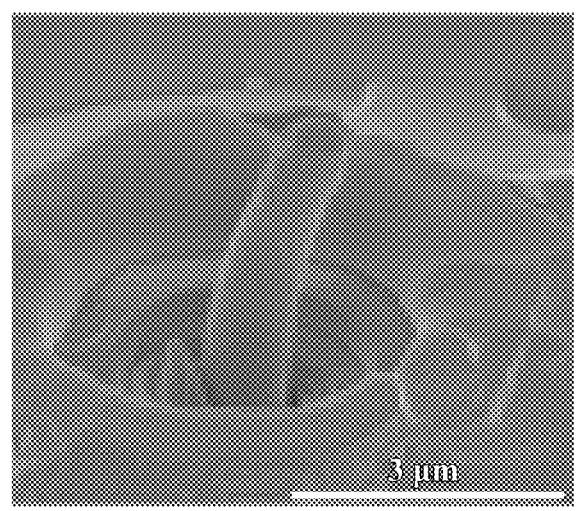
Figure 9C:
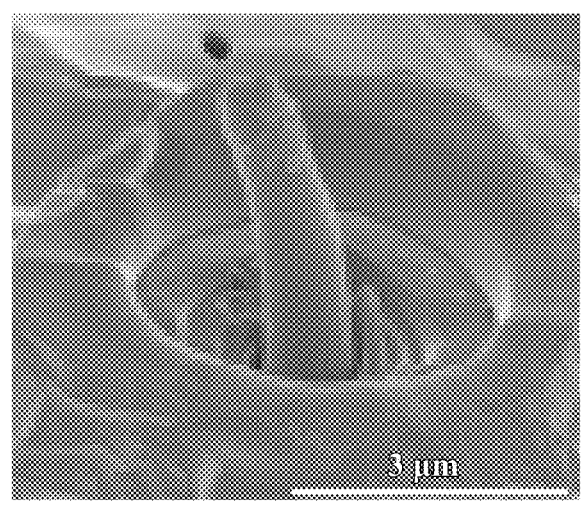

FIG. 9A is a scanning electron micrograph of the oligocrystalline pillar prior to the compression testing. FIGS. 9B and 9C are scanning electron micrographs of the oligocrystalline pillar after compression testing, showing two views of the pillar rotated 180° from each other. The compression testing produced a shape memory strain in the oligocrystalline pillar of about 5%, calculated as beam bending. As can be seen clearly in FIGS. 9B-9C, no micro-cracks formed in the oligocrystalline during the bending.

The compression led to permanent deformation of the oligocrystalline pillar. The pillar was subsequently heated for two hours at a temperature of 600° C., which is greater than the austenitic phase finish temperature, $T_{Af}$=430° C. After this heating, the oligocrystalline pillar returned to the original upright position. The oligocrystalline ceramic pillar thereby demonstrated a full shape memory effect cycle without cracking or fracture.

This example demonstrates that the oligocrystalline ceramic structures provided herein overcome the cracking and fracture limitations that are characteristic of conventional brittle ceramic materials. Any in a wide range of suitable martensitic transformation control stimuli, including thermal and mechanical, can be employed to control martensitic transformation of the oligocrystalline ceramic structures; and thus the oligocrystalline ceramic material structures can be employed for many applications, e.g., as mechanical actuators, as mechanical couplings, as armor materials for dissipating energy when the oligocrystalline ceramic material is impacted or loaded, and in biomedical devices, as well as a host of other applications.

It is recognized that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A mechanical structure comprising:
a crystalline ceramic material that is capable of undergoing a reversible martensitic transformation and forming martensitic domains, during such martensitic transformation, that have an average elongated domain length; and the crystalline ceramic material being configured as an oligocrystalline ceramic material structure having a total structural surface area that is greater than a total grain boundary area in the oligocrystalline ceramic material structure, the oligocrystalline ceramic material structure including an oligocrystalline ceramic structural feature having an extent that is less than the average elongated domain length of the crystalline ceramic material.

2. The mechanical structure of claim 1 wherein the crystalline ceramic material comprises an element selected from the group consisting of zirconium, magnesium, and oxygen.

3. The mechanical structure of claim 2 wherein the crystalline ceramic material comprises $ZrO_2$.

4. The mechanical structure of claim 3 wherein the crystalline ceramic material comprises $ZrO_2$ doped with a dopant selected from the group consisting of cerium, yttrium, hafnium, calcium, ytterbium, europium, and magnesium.

5. The mechanical structure of claim 1 wherein the oligocrystalline ceramic material structural feature is less than 100 microns in extent.

6. The mechanical structure of claim 1 wherein the oligocrystalline ceramic material structural feature is less than 50 microns in extent.

7. The mechanical structure of claim 1 wherein the oligocrystalline ceramic material structural feature is no greater than 5 microns in extent.

8. The mechanical structure of claim 1 wherein the crystalline ceramic material is capable of undergoing a reversible martensitic transformation and can be transformed fully to martensite at a temperature that is greater than 20° C.

9. The mechanical structure of claim 1 wherein the crystalline ceramic material structure is capable of undergoing a reversible martensitic transformation that produces a martensitic transformation strain level in the oligocrystalline ceramic material structure that is greater than 1%.

10. The mechanical structure of claim 1 wherein the crystalline ceramic material structure is capable of undergoing a reversible martensitic transformation that produces a martensitic transformation strain level in the oligocrystalline ceramic material structure that is greater than 2%.

11. The mechanical structure of claim 1 wherein the oligocrystalline ceramic material structure is capable of undergoing a reversible martensitic transformation that can dissipate energy during a martensitic transformation with a merit index value, $E^{1/2}(\Delta W/\pi W_{max})$, that is at least about 1.8, where E is Young's modulus for the ceramic material, $\Delta W$ is dissipated energy per unit volume of the crystalline ceramic material for one martensitic transformation cycle, and $W_{max}$ is maximum stored mechanical energy per unit volume of the crystalline ceramic material for one martensitic transformation cycle.

12. The mechanical structure of claim 1 wherein the oligocrystalline ceramic material structure comprises a planar geometry selected from the group consisting of plate, layer, film, coating, and free-standing membrane, with a thickness of the planar geometry being the oligocrystalline ceramic material structural feature extent that is less than the crystalline ceramic material average elongated domain length.

13. The mechanical structure of claim 1 wherein the oligocrystalline ceramic material structure comprises a cylindrical geometry selected from the group consisting of pillar, wire, fiber, and wire-like cylindrical object, with a diameter of the cylindrical geometry being the oligocrystalline ceramic material structural feature extent that is less than the crystalline ceramic material average elongated domain length.

14. The mechanical structure of claim 12 wherein the oligocrystalline ceramic material structure is capable of undergoing a reversible martensitic transformation that can dissipate energy during a martensitic transformation with a merit index value that is at least about 2.5.

15. The mechanical structure of claim 1 wherein the oligocrystalline ceramic material structure comprises a beam geometry selected from the group consisting of cantilever beam and doubly-supported beam, with a thickness of the beam geometry being the oligocrystalline ceramic material structural feature extent that is less than the crystalline ceramic material average elongated domain length.

16. The mechanical structure of claim 1 wherein the oligocrystalline ceramic material structure comprises an open cell foam geometry, with a thickness of an internal foam strut being the oligocrystalline ceramic material structural feature extent that is less than the crystalline ceramic material average elongated domain length.

17. The mechanical structure of claim 1 wherein the oligocrystalline ceramic material structure comprises a tube, with a thickness of a tube wall being the oligocrystalline ceramic material structural feature extent that is less than the crystalline ceramic material average elongated domain length.

18. The mechanical structure of claim 1 wherein the oligocrystalline ceramic material structure is arranged for accepting mechanical input at the oligocrystalline ceramic material structural feature for controlling martensitic transformation of the oligocrystalline ceramic material structure.

19. The mechanical structure of claim 1 wherein the oligocrystalline ceramic material structure is capable of undergoing at least two martensitic transformation cycles without cracking.

20. The mechanical structure of claim 1 further comprising a mechanical input at the oligocrystalline ceramic material structural feature for cyclical mechanical actuating of the oligocrystalline ceramic material structural feature by martensitic transformation.

* * * * *